Figure 1A:
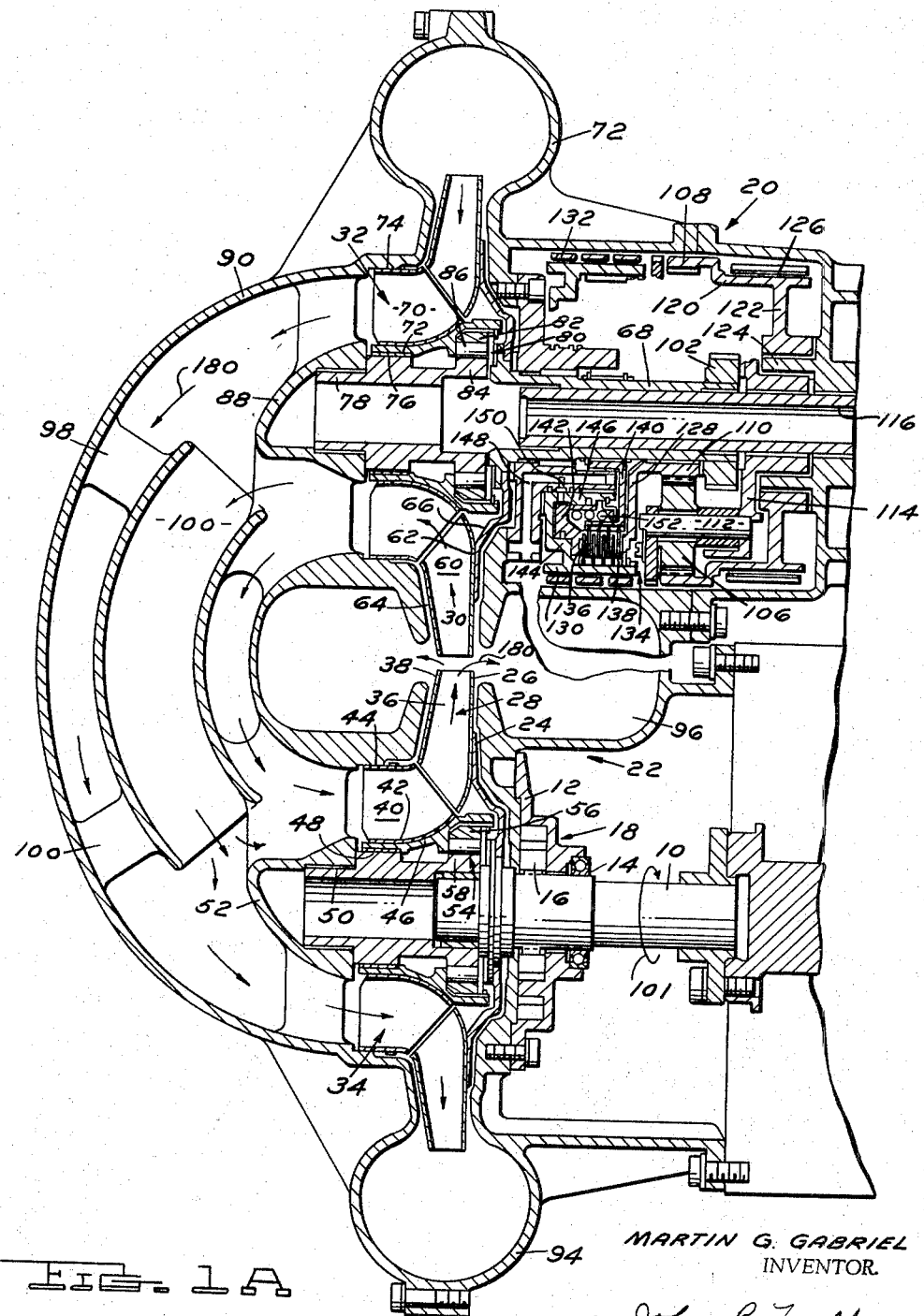

MARTIN G. GABRIEL
INVENTOR.

BY John R. Faulkner
Robert E. McCollum
ATTORNEYS

MARTIN G. GABRIEL
INVENTOR.

BY John R. Faulkner
Robert E. McCollum
ATTORNEYS

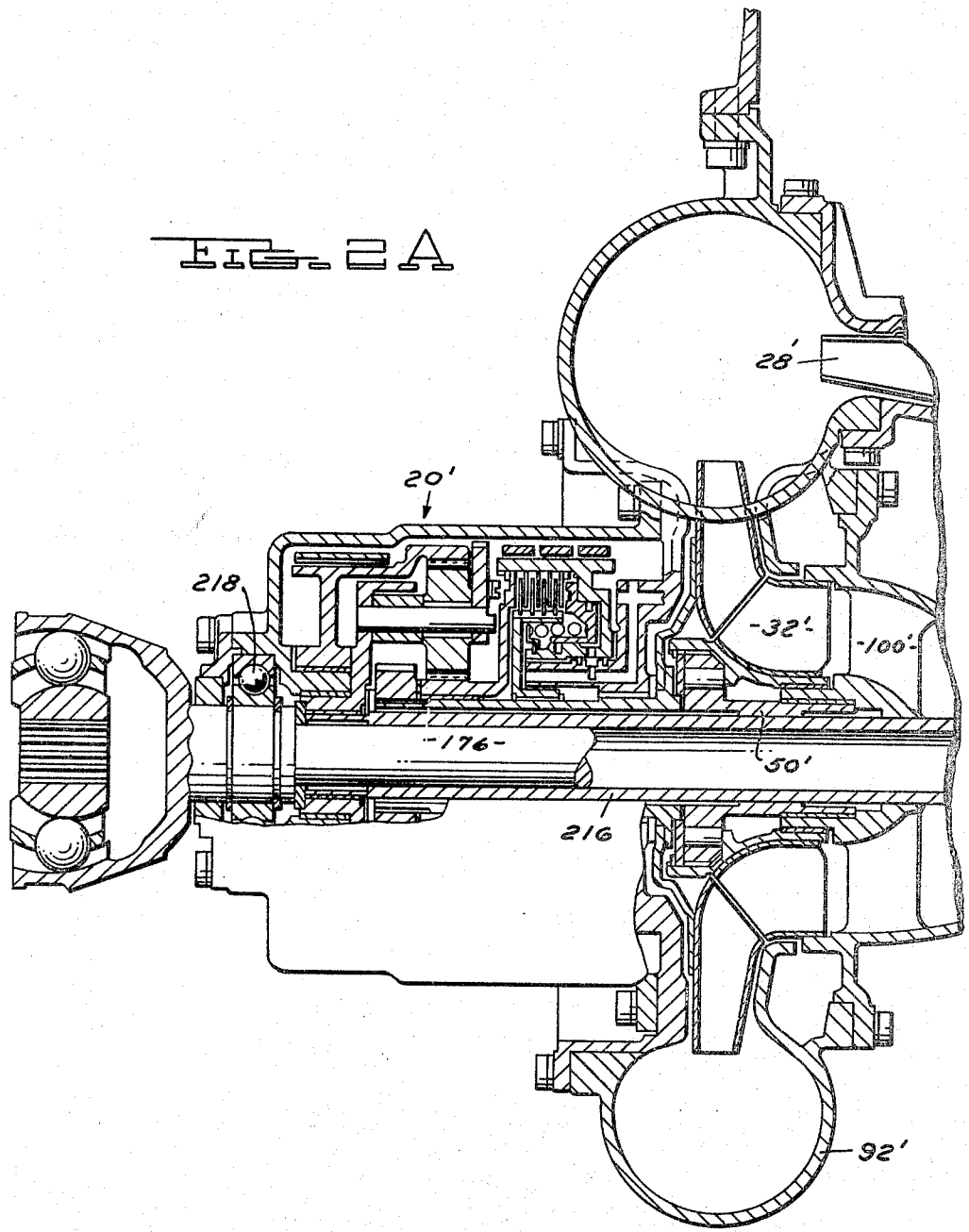

April 4, 1967    M. G. GABRIEL    3,312,060
HYDRODYNAMIC TRANSFER DRIVE ARRANGEMENT
Filed Oct. 23, 1963    5 Sheets-Sheet 5

MARTIN G. GABRIEL
INVENTOR.

BY John R. Faulkner
Robert E. McCollum
ATTORNEYS

United States Patent Office 3,312,060
Patented Apr. 4, 1967

3,312,060
HYDRODYNAMIC TRANSFER DRIVE
ARRANGEMENT
Martin George Gabriel, Dearborn, Mich., assignor to Ford Motor Company, Dearborn, Mich., a corporation of Delaware
Filed Oct. 23, 1963, Ser. No. 318,287
8 Claims. (Cl. 60—54)

This invention realtes to a hydrodynamic assembly for transferring a drive between shafts that do not have a common axis of rotation; that is, axes that are either parallel, or at an angle to each other. Preferably, the invention is for use to provide a front wheel drive for a motor vehicle, or a rear wheel drive with the torque transfer means located near the rear axles, although it will have use in many other installations.

In prior installations of this type, the transfer of torque between two parallel shafts or shafts at angles to each other, has been made, in general, by means of mechanical gearing, chain drives, or the like. The use of these types of transfer drives has many disadvantages, however. For example, the overall size of the drive arrangement becomes large due to the use of a greater number of moving parts. Also, the large number of parts decreases the reliability and increases the cost implications. Furthermore, the noise level is increased.

This invention eliminates the above disadvantages by hydrodynamically connecting noncoaxially rotating shafts by a hydraulic torque converter having elements rotatable about different axes. Connecting the shafts in this manner not only minimizes the number of moving parts, but also minimizes the cost implications and the noise generated, as well as reduces the power losses between shafts. The invention therefore provides a transfer drive that is compact in design, simple in construction, and economical to manufacture and operate.

It is an object of the invention, therefore, to provide a hydrodynamic drive for transferring power between shafts having noncoaxial axes of rotation.

It is a further object of the invention to provide a hydrodynamic transfer drive arrangement having torque multiplying means to extend the range of performance.

It is a still further object of the invention to transfer the torque between shafts rotating about noncoaxial axes by means of a hydraulic torque converter having a radial centrifugal pump and turbine and reaction members for multiplying the torque delivered.

It is also an object of the invention to provide a transfer drive between rotating shafts that permits the use of an in-line reduction gear unit instead of a differential pinion-ring gear arrangement to drive the axles of a motor vehicle.

It is a still further object of the invention to provide a hydrodynamic transfer drive consisting of radial centrifugal pump and turbine members fluid connected by a compound volute casing, and multiplying the input torque to a multi-speed gearset.

Figure 1B:
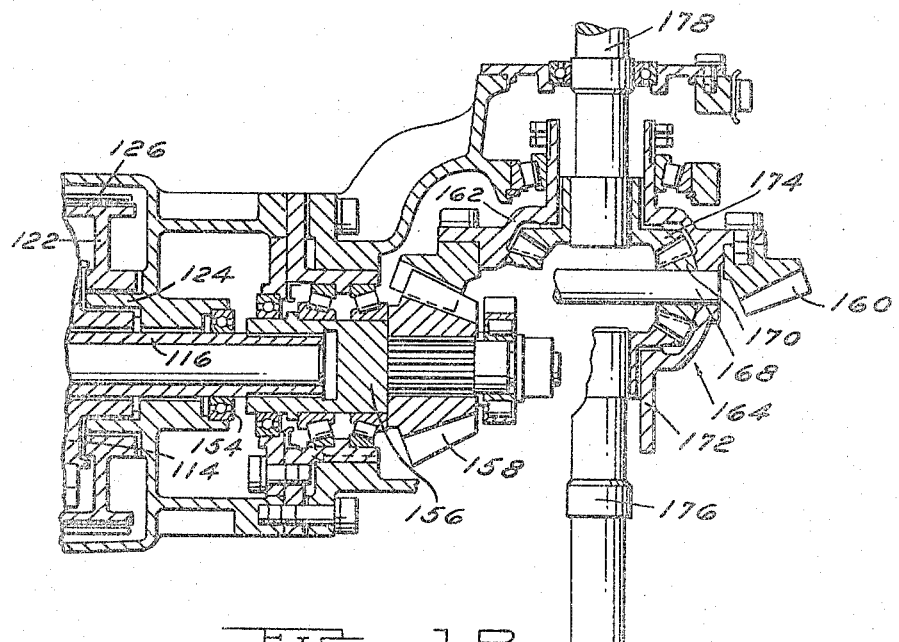
Figure 1C:
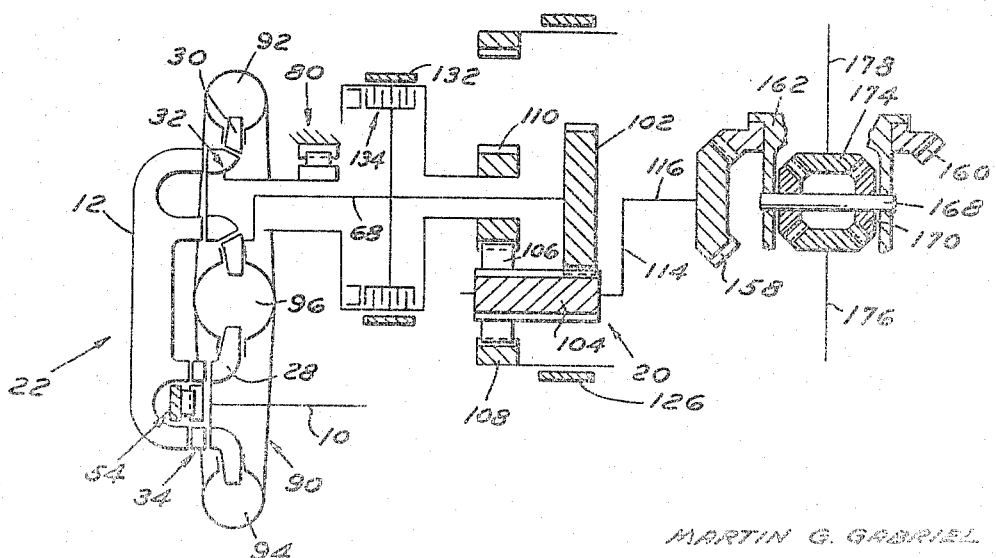
Figure 2B:
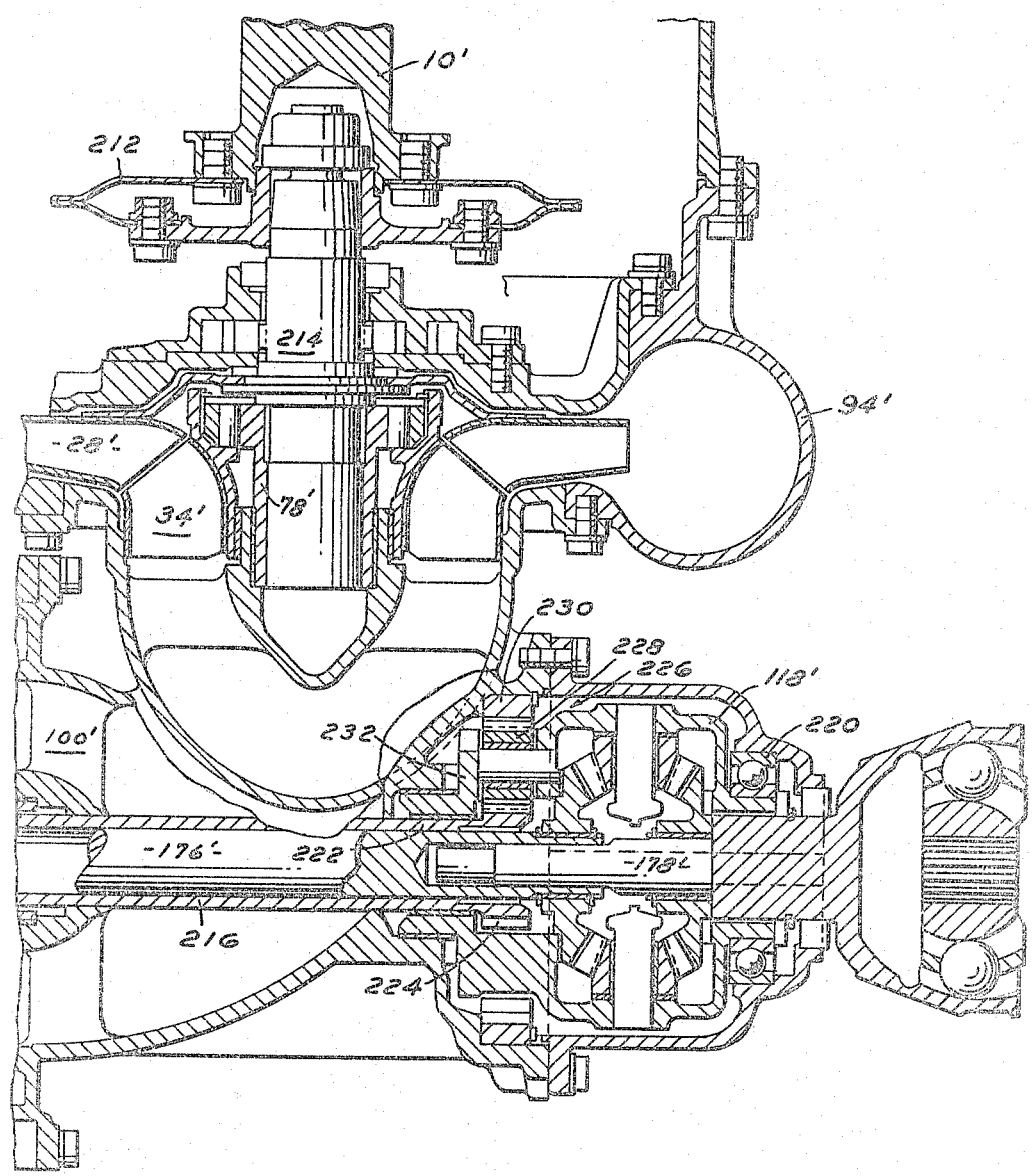
Figure 5:
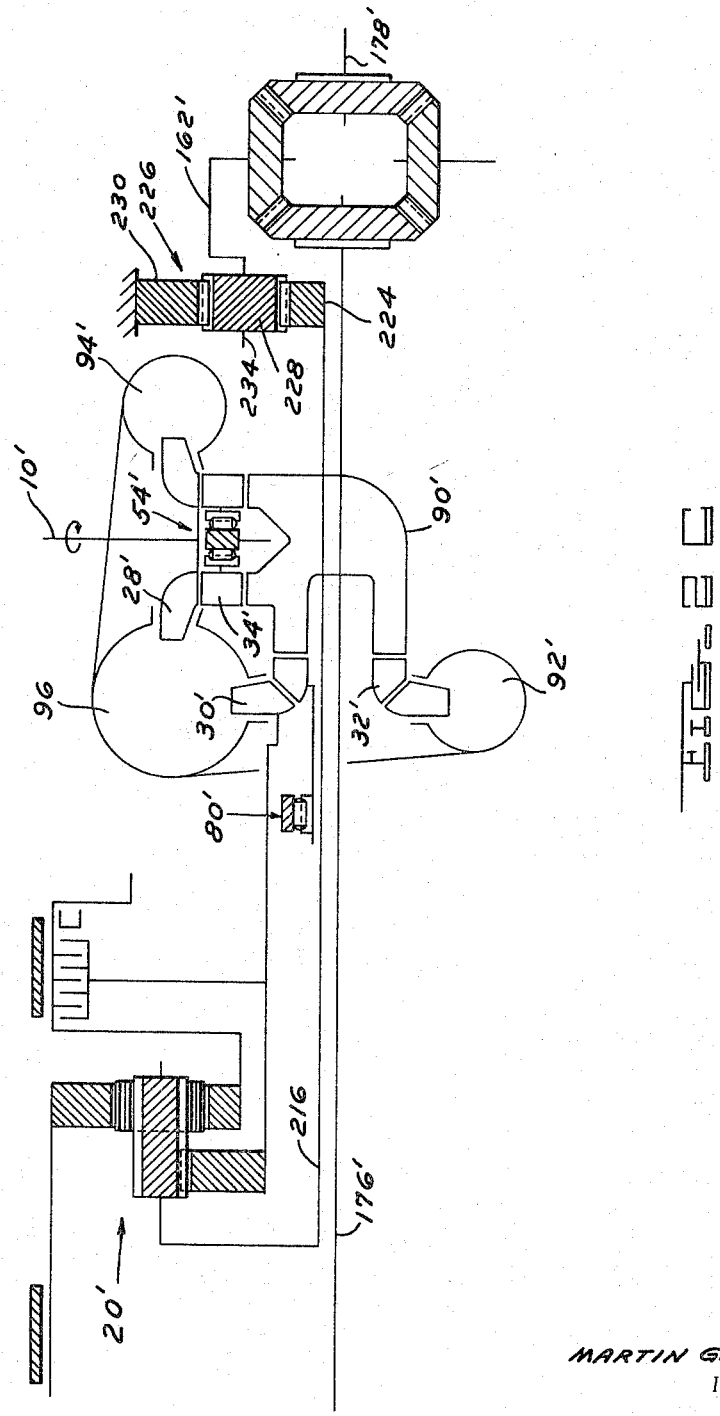

Other objects, features, and advantages of the invention will become apparent upon reference to the succeeding detailed description thereof, and to the drawings illustrating the preferred embodiments thereof; wherein, FIGURES 1a and 1b, when joined together in the manner illustrated in FIGURE 1c, are cross-sectional views together illustrating one embodiment of the torque transfer drive arrangement constructed according to the invention;

FIGURE 1c is a schematic illustration of the complete embodiment shown in FIGURES 1a and 1b;

FIGURES 2a and 2b, when placed together in the manner illustrated in FIGURE 2c, are cross-sectional views together illustrating another embodiment of the invention; and, FIGURE 2c is a schematic representation of the complete embodiment shown in FIGURES 2a and 2b.

FIGURES 1a and 1b, which are essentially to scale, and FIGURE 1c, illustrate a drive arrangement transferring the power between two shafts having parallel axes of rotation. For clarity, the figures show an arrangement tilted 90° from its normal position. A drive shaft 10, which is preferably driven by an internal combustion engine (not shown) for a motor vehicle, is rotatably mounted in a stationary casing 12 on an annular bearing 14. Splined to the shaft is a rotor 16 of a hydraulic pump 18. The pump supplies the fluid necessary to operate the control mechanisms and fluid pressure actuated devices for a two-speed planetary gearset 20, to be described later. The pump also supplies the fluid requirements for the torque transmitting device or converter 22, which hydrodynamically transfers the power from drive shaft 10 to the gearset.

Drive shaft 10 is also provided with a radial flange 24, to which is fixed the outer annular shroud or casing 26 of a radial centrifugal fluid impeller or pump 28. The impeller constitutes one element of the torque converter 22, which also includes a radial flow fluid turbine 30 and stator or reaction members 32 and 34. The stator members are located adjacent the outlet and inlet portions of the turbine and impeller members, respectively.

The impeller 28 is defined by a number of circumferentially spaced, curved, radial flow blades 36 suitably secured between an inner annular shroud 38 and the outer shroud 26. The stator member 34 is located on the fluid inlet side of the impeller to extend the performance range of the fluid converter. It consists of a number of curved blades 40 secured between annular inner and outer shrouds 42 and 44. The inner shroud 42 is journaled at one edge portion 46 on the boss 48 of a sleeve shaft 50, which is secured in a stationary portion 52 of the torque converter casing 12. The stator member is adapted to freewheel in one direction of rotation, and is held against rotating in the opposite direction. This is accomplished by means of a one-way or overrunning brake 54 having an outer annular race 56 nonrotatably secured within the boss 46, and an inner annular race 58 formed as a portion of the sleeve shaft 50. The races are separated by sprags or rollers 59 that permit rotation of the stator in the same direction as that of the impeller 28, but lock the stator to the stationary sleeve 50 during any attempt to rotate it in the opposite direction.

Turbine member 30 is positioned in the path of the fluid discharge from impeller 28, and rotates in an opposite direction about an axis parallel to that of drive shaft 10. The turbine is of a construction similar to impeller 28. It has a number of circumferentially spaced, radial flow blades 60 secured between outer and inner annular shrouds 62 and 64. Shroud 62 is welded or otherwise secured to an annular radial flange 66 nonrotatably mounted on the end of a sleeve shaft 68. The fluid flow passes radially inwardly from the turbine blades into the inlet of stator member 32. This stator, like stator 34, consists of an annular row of blades 70 secured between annular inner and outer shrouds 72 and 74. The inner shroud is secured to a stator hub 75 rotatably journaled at one edge portion 76 on a stationary sleeve shaft 78. This stator has a controlled rotation, as determined by a one-way or overrunning brake 80, similar in construction to that of brake 54. Brake 80 has an annular outer race 82 secured within the stator hub 75, the race being separated from an annular inner race 84 by a number of sprags or rollers 86. The inner race 84 is formed as a boss on the sleeve 78, which is fixed in a stationary portion 88 of the converter casing 12. Brake 80 permits rotation of the stator in the same direction as the turbine 30, while preventing rotation in the opposite direction.

The fluid working circuit for the flow through the impeller, turbine, and stator members is defined by a double or compound volute casing 90 having two coplanar sections 92 and 94 with a common central flow portion 96. The portions 92 and 94 are shown as being of a spiral shape in cross section, gradually increasing in cross-sectional area. The casing also has a number of guide channels defined by stationary members 98 and flow diffusers 100 for guiding the flow discharged through the turbine 30 and stator 32 into the inlet portions of the stator 34 and impeller 28. The guide passages and diffusers control the velocity and pressure distribution in a known manner to provide an efficient operation.

The hydraulic torque converter operates in a known manner by drawing fluid past the stator 34 into the impeller inlet, where it flows radially and is discharged outwardly to impinge against the turbine blades 60. It then flows inwardly through the turbine and stator 32 and past the diffusers 100, and is recirculated back to the inlet of the impeller 28. The clockwise rotation of drive shaft 10 in the direction of arrow 101 effects a counter-clockwise rotation of the turbine 30 and shaft 68. The stator blades 70 and 40 are shaped so that at low rotational turbine speeds, the fluid leaving the turbine blades strikes the backs of the stator blades, attempting to drive them in directions opposite to that of the turbine and impeller blades, respectively. This rotation, however, is prevented by the lockup of the one-way brakes 80 and 54, so that a torque multiplying range of operation is effected. At higher turbine speeds, the angle of discharge of the fluid as it leaves the turbine blades and enters the stator blades 40 changes progressively until a point is reached where the fluid strikes the forward portions of each of the stator blades in a manner tending to drive them in the same direction as that of the turbine and impeller blades, respectively. The one-way brakes then unlock and permit this rotation. The torque multiplying range of operation then ceases.

The turbine shaft 68 is the power input shaft for the planetary gearset 20, and has a sun gear 102 splined to it. The gearset is of the intermeshing planet pinion type including a number of spaced sets (only one shown) of long and short intermeshing pinion gears 104 (FIGURE 1c) and 106. The pinion gear 104 meshes with sun gear 102, while the short pinion gears 106 mesh both with a ring gear 108 and a second sun gear 110. The pinions are rotatably mounted on pinion shafts 112 secured in a planet gear carrier 114. The carrier in turn is splined to a power output sleeve shaft 116. Ring gear 108 is extended axially and radially at 120 and 122, the portion 122 being journaled for rotation on a stationary portion 124 of the gear casing. The portion 120 has a friction material on its outer surface for cooperation with a fluid pressure or other suitably actuated annular brake band 126.

The secondary sun gear 110 has a radial flange 128 splined to a drum 130. The drum serves two functions. Its outer surface is lined with a friction material for cooperation with a fluid pressure actuated brake band 132 for holding sun gear 110 stationary at times. The drum also serves as the driven portion of a fluid pressure actuated clutch pack 134. The clutch has a number of annular friction plates 136 splined externally to the drum and interleaved with a number of similar friction discs 138 splined to a radial extension 140 of sleeve shaft 68. The discs are located axially between the flange 128 and an annular fluid pressure actuated piston 142. The piston is sealingly and axially slidably mounted in a recess 144 in a U-shaped extension 146 of drum 130, the extension being rotatably mounted on the fluid pump housing. The clutch is engaged by admitting fluid under pressure from oil pump 18 through suitable passages 148 and 150 in the housing to actuate piston 142. Upon release of the fluid pressure, it is disengaged by means of a compression spring 152.

As will be explained in more detail later, the gearset 20 provides a forward reduction drive by engaging band 132 alone and driving sun gear 102; a direct drive by engaging clutch 134 alone; a reverse drive by engaging band 126 alone; and a neutral condition of operation by disengaging all the bands and the clutch.

The output shaft 116 is rotatably mounted in the gear casing on a bearing 154. It is drivingly splined to one end of a shaft 156, on which is nonrotatably mounted a power output pinion gear 158. Gear 158 meshes constantly with a ring gear 160 secured to the cage 162 of a differential assembly 164. The latter assembly is of a known type wherein the differential cage or carrier 162 rotates a number of planet pinion gear shafts 168, the pinion shafts rotatably supporting gears 170. The planet gears mesh with side gears 172 and 174 splined to axle shafts 176 and 178, respectively.

No fluid pressure control system has been shown for selectively and automatically controlling the supply and vent of fluid under pressure to the various brakes and the clutch for controlling the operation since it may be of a known type, and is believed to be unnecessary for an understanding of the invention. Suffice it to say, that the gear ratios and torque multiplication would be accomplished automatically in response to changes in speed of the motor vehicle and/or engine torque changes, or established manually, in a manner providing smooth transitions between speed ranges.

For low speed operation, brake band 132 is engaged to hold sun gear 110 against rotation. Clockwise rotation of drive shaft 10 in the direction of arrow 101 then rotates impeller 28 in the same direction to draw fluid through stator 34 and pump it radially along the impeller blades 36. A fluid flow head is then developed, resulting in a transfer of fluid energy to the turbine 30 as indicated by the arrows 180. Turbine 30 is therefore driven in a counterclockwise direction. At low turbine speeds, the radially inward flow through the turbine strikes the back of the stator blades 70, attempting to rotate them in a clockwise direction. This rotation, however, is prevented by engagement of the one-way brake 80. The hydrodynamic unit then operates as a fluid torque converter to provide a torque multiplying range. The flow discharged from the stator 32 passes through the guide vanes 98 and diffusers 100, and is directed against the backs of the blades of the stator 34. The one-way brake 54 then engages and prevents the stator from rotating in a counterclockwise direction at low speeds.

Simultaneously, the counterclockwise rotation of turbine shaft 68 drives sun gear 102 in the same direction, causing pinions 104 and 106 and carrier 114 to planetate in a counterclockwise direction about the stationary reaction sun gear 110. This results in a drive of output shaft 116 in a counterclockwise direction, but at a speed reduced from that of the turbine shaft 68. The drive ratio is then again changed by the ratio between gears 158 and 160, and is transferred to the axle shafts 176 and 178 by the differential assembly 164.

Upon continued increase in rotation of drive shaft 10, turbine 30 increases in speed until the fluid discharged from its blades strike the fronts of the blades of the stators 32 and 34, causing one-way brakes 80 and 54 to unlock, and the stators to rotate in the respective directions of turbine 30 and impeller 28. At this point, as previously described, suitable control mechanisms may be activated by an output shaft speed responsive pressure signal and/or engine torque sensitive device, or any other suitable means, to effect a disengagement of the low speed brake band 132, and an engagement of clutch 134 by admission of fluid under pressure to act against the piston 142.

The torque multiplying phase of operation of the fluid converter is thus terminated coincidental with the gearset being locked up for a direct drive upon rotation of sun gears 102 and 110 at the same speed. The output shaft 116, therefore, is driven at the speed of turbine shaft 68, and approximately at the speed of input shaft 10.

It will be seen, therefore, that the embodiment illustrated and described in FIGURE 1 (FIGURES 1a, 1b, 1c) provides a power transfer mechanism for driving the output shaft 120 substantially at the speed of the power input drive shaft 10 through the agency of the hydraulic torque converter 22 and the locked up gearset 20.

A drive of output shaft 116 in a direction opposite to that normally provided may be obtained by engaging reverse band 126 and releasing low band 132 and clutch 134. The counterclockwise rotation of sun gear 102 then causes a reverse planetation of pinions 104 and 106 and carrier 116 within the stationary reaction ring gear 108 to rotate shaft 116 in a direction opposite to that of turbine shaft 68.

The drive of output shaft 116 may be interrupted to provide a neutral or no-drive condition of operation by disengaging brake bands 126 and 132, and clutch 134. Both the sun and ring gears 110 and 108 are then free to rotate, and no reaction member is provided for the gearset.

FIGURES 2a, 2b, and 2c, which will be referred to collectively as FIGURE 2, illustrate a hydrodynamic power transfer arrangement for an angle drive as compared to the parallel shaft drive of FIGURE 1. In FIGURE 2, members that are the same or similar in construction and operation to like members in FIGURE 1 are indicated by primed corresponding numerals. Their construction and operation is, therefore, not repeated.

In the embodiment of FIGURE 2, the drive shaft 10' is bolted or otherwise secured to a conventional engine flywheel member 212 splined to a secondary input shaft 214. The shaft 214 is secured to a radial centrifugal impeller 28' in the same manner as shown and described in connection with FIGURE 1. In FIGURE 2, the radial flow turbine member 30' is disposed in a plane of rotation that is at right angles to that of the plane of the impeller 28', as compared with that shown in FIGURE 1. Accordingly, the volute casing 90' is formed in two sections 92' and 94' at right angles to each other with a central common portion 96' between. The portions are interconnected by suitable flow passages, as indicated, receiving the discharge from the turbine to guide the flow past diffusers 100' to the impeller 28'. As a result of this right angle construction, the stator members 32' and 34' are mounted on the respective stationary sleeve shafts 50' and 78' in planes at right angles to each other, and through the agencies of one-way brakes 80' and 54'.

The construction and operation of the gearset 20' is similar to that of FIGURE 1, except for rotation of turbine 30' in the same direction as impeller 28', and the disposition of the power output sleeve shaft 216 with respect to the rear axles. In FIGURES 2a, 2b, and 2c, the sleeve shaft 216 rotatably surrounds the two axle shafts 176' and 178', which are supported to the transfer and differential casings 90' and 220, respectively. Axle shaft 178' is further rotatably piloted within axle shaft 176', as shown. The end 222 of output shaft 216 adjacent the gear carrier 114' is splined to the sun gear 224 of a second planetary gear unit 26. This gear unit is of the simple three-element type having a number of spaced pinions 228 (only one shown) meshing with the sun gear 224 and a ring gear 230 fixed in the torque converter casing. The pinions are rotatably mounted on shafts 232 secured in a carrier 234, an extension of which becomes the differential pinion cage 162'. In this instance, the conventional differential pinion ring gear connection to the cage 162', as in FIGURE 1, is eliminated, and the cage is connected directly to the gear unit carrier 234. The torque is then transmitted from the cage to both axle shafts 176' and 178' from the pinion and side gears.

The elimination of the output shaft pinion and differential ring gear thus reduces space and permits an in-line connection from the output shaft 216 to the axle shafts. The holding of the ring gear 230 stationary at all times conditions the gearset 226 for a permanent reduction drive, thereby providing a reduction similar to that provided by the ring gear 160 and pinion gear 153 of FIGURE 1.

The operation of this embodiment is quite similar to the embodiment of FIGURES 1a, 1b, and 1c, and is believed to be clear from a consideration of the drawings. In FIGURE 2, it will be noted however, that the turbine 30' is driven at right angles to the axis of impeller 28', and in the same direction as compared to the coplanar and opposite directional drive provided in FIGURE 1. Also, an in-line drive to the axles is provided instead of the right angle drive of FIGURE 1.

From the foregoing, therefore, it will be seen that the invention provides a compact power transfer drive between shafts that do not have common axes of rotation, and one that permits substantially a direct drive with low power losses.

While the invention has been illustrated in its preferred embodiments, it will be clear to those skilled in the arts to which the invention pertains that many changes and modifications may be made thereto without departing from the scope of the invention.

I claim:

1. A mechanism for the transfer of power between a plurality of shafts each having a different axis of rotation, comprising, power input and output shafts rotatable about different axes, and hydrodynamic power transfer means therebetween, said power transfer means including a hydraulic torque converter having a radial centrifugal pump and a turbine rotatable about different axes, means connecting said pump and said input shaft, means connecting said turbine to said output shaft, said converter also having a reaction member, and means for preventing rotation of said reaction member in one direction while permitting rotation in the opposite direction to effect a torque multiplying stage of operation of said converter or to terminate the same, respectively.

2. A mechanism for the transfer of power between a plurality of shafts each having a different axis of rotation, comprising, power input and output shafts rotatable about different axes, and hydrodynamic power transfer means therebetween, said power transfer means including a hydraulic torque converter having a radial centrifugal pump and a turbine rotatable about different axes, means connecting said pump and said input shaft, means connecting said turbine to said output shaft, said converter also having a reaction member, and a volute casing fluid connecting said pump and turbine and reaction member, and means for preventing rotation of said reaction member in one direction while permitting rotation in the opposite direction to effect a torque multiplying stage of operation of said converter or to terminate the same, respectively.

3. A mechanism for the transfer of power between a plurality of shafts each having an axis of rotation at an angle with respect to each other, comprising, power input and output shafts rotatable about intersecting axes, and hydrodynamic power transfer means therebetween, said power transfer means including a hydraulic torque converter having a radial centrifugal pump and a turbine each rotatable about a different axis, means connecting said pump and said input shaft, means connecting said turbine to said output shaft, said converter also having a reaction member, and means for preventing rotation of said reaction member in one direction while permitting rotation in the opposite direction to effect a torque multiplying stage of operation of said converter or to terminate the same, respectively.

4. A mechanism for the transfer of power between a plurality of shafts each having an axis of rotation at an angle with respect to each other, comprising, power input and output shafts rotatable about intersecting axes, and hydrodynamic power transfer means therebetween, said power transfer means including a hydraulic torque converter having a radial centrifugal pump and a turbine each rotatable about a different axis, means connecting said pump and said input shaft, means connecting said turbine to said output shaft, said converter also having a reaction member, and a volute casing fluid connecting said pump and turbine and reaction member, and means for preventing rotation of said reaction member in one direction while permitting rotation in the opposite direction to effect a torque multiplying stage of operation of said converter or to terminate the same, respectively.

5. A mechanism for the transfer of power between a plurality of shafts each having an axis of rotation offset with respect to each other, comprising, power input and output shafts rotatable about different axes, and hydrodynamic power transfer means therebetween, said power transfer means including a hydraulic torque converter having a radial centrifugal pump and a turbine rotatable about different axes, said converter also having a reaction member, means for preventing rotation of said reaction member in one direction while permitting rotation in the opposite direction to effect a torque multiplying stage of operation of said converter or to terminate the same, respectively, means connecting said pump and said input shaft, and means connecting said turbine to said output shaft.

6. A mechanism for the transfer of power between a plurality of parallel shafts each having an axis of rotation offset with respect to each other, comprising, power input and output shafts rotatable about different axes, and hydrodynamic power transfer means therebetween, said power transfer means including a hydraulic torque converter having a radial centrifugal pump and a turbine rotatable about parallel axes, said converter also having a reaction member, and a volute casing fluid connecting said pump and turbine and reaction member, means for preventing rotation of said reaction member in one direction while permitting rotation in the opposite direction to effect a torque multiplying stage of operation of said converter or to terminate the same, respectively, means connecting said pump and said input shaft, and means connecting said turbine to said output shaft.

7. A mechanism for the transfer of power between a plurality of shafts having different axes of rotation, comprising, power input and output shafts rotatable about noncoaxial axes, and power transfer means between said shafts, said power transfer means including a hydraulic torque multiplying means having a plurality of rotatable elements including pump and turbine and a plurality of spaced reaction elements one adjacent the fluid inlet and outlet respectively of said pump and turbine elements, means at times preventing rotation of each of said reaction elements in one direction to effect a torque multiplying stage of operation of said hydraulic means, while permitting rotation in the opposite direction to terminate said torque multiplying stage of operation, and means connecting said pump element to said power input shaft and said turbine element to said output shaft.

8. A mechanism for the transfer of power between a plurality of shafts having different axes of rotation, comprising, power input and output shafts rotatable about noncoaxial axes, and multi-speed range power transfer means therebetween, said power transfer means including a hydrodynamic torque multiplying device having a plurality of rotatable elements including a pump and a turbine element each connected to different noncoaxial ones of said shafts for rotation, and including a reaction element, and means for preventing rotation of said reaction element in one direction while permitting rotation in the opposite direction to effect a torque multiplying stage of operation of said device or to terminate the same, respectively.

References Cited by the Examiner
UNITED STATES PATENTS

| | | | |
|---|---|---|---|
| 601,731 | 4/1898 | Lufbery | 74—695 |
| 736,172 | 8/1903 | Talen et al. | 74—695 |
| 1,141,812 | 6/1915 | Michell et al. | 60—54 |
| 1,451,997 | 4/1923 | Michell | 60—54 |
| 1,583,736 | 5/1926 | Nydquist | 60—54 |
| 2,353,060 | 7/1944 | Norman | 60—54 |
| 2,781,858 | 2/1957 | Kelley et al. | 74—720.5 |
| 3,029,662 | 4/1962 | Hause | 74—695 |
| 3,205,730 | 9/1965 | Hause | 74—695 |

FOREIGN PATENTS

| | | |
|---|---|---|
| 2,885 | 1913 | Great Britain. |
| 179,179 | 7/1923 | Great Britain. |

DAVID J. WILLIAMOWSKY, *Primary Examiner.*

THOMAS C. PERRY, *Examiner.*